(12) United States Patent
Hong et al.

(10) Patent No.: US 11,964,658 B2
(45) Date of Patent: Apr. 23, 2024

(54) APPARATUS FOR CONTROLLING RESTART A VEHICLE, SYSTEM HAVING THE SAME AND METHOD THEREOF

(71) Applicants: Hyundai Motor Company, Seoul (KR); Kia Corporation, Seoul (KR)

(72) Inventors: Jeong Ki Hong, Whasung-Si (KR); Kyung Joo Bang, Whasung-Si (KR); Kyeong Eun Kim, Whasung-Si (KR); Dong Hyuk Kim, Whasung-Si (KR); Il Hwan Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/707,205

(22) Filed: Mar. 29, 2022

(65) Prior Publication Data

US 2023/0097843 A1  Mar. 30, 2023

(30) Foreign Application Priority Data

Sep. 27, 2021 (KR) .................. 10-2021-0127478

(51) Int. Cl.
*B60W 30/18* (2012.01)
*B60W 40/076* (2012.01)
*B60W 40/10* (2012.01)

(52) U.S. Cl.
CPC .... *B60W 30/18027* (2013.01); *B60W 40/076* (2013.01); *B60W 40/10* (2013.01); *B60W 2710/0666* (2013.01)

(58) Field of Classification Search
CPC ......... B60W 30/18027; B60W 40/076; B60W 40/10; B60W 2710/0666; B60W 2530/10; B60W 30/18118; B60W 60/001; B60W 2520/10; B60W 10/04; B60W 2552/15; B60W 2710/0672; B60W 2710/085; B60W 40/105; B60W 40/13; B60W 2050/0005; B60W 2554/4042; B60W 2554/802
See application file for complete search history.

(56) References Cited

U.S. PATENT DOCUMENTS

| 8,202,199 | B2 | 6/2012 | Katakura et al. |
| 8,214,112 | B2 | 7/2012 | Rew et al. |
| 10,280,868 | B2 | 5/2019 | Kemwal et al. |
| 2009/0143195 | A1 | 6/2009 | Katakura et al. |
| 2010/0324798 | A1* | 12/2010 | Rew ..................... F02N 11/0814 701/99 |
| 2021/0171030 | A1* | 6/2021 | Lee ..................... B60W 30/146 |

FOREIGN PATENT DOCUMENTS

| EP | 2070797 A | 6/2009 |
| JP | 2010-531411 A | 9/2010 |
| KR | 10-2019-0109636 A | 9/2019 |

* cited by examiner

*Primary Examiner* — Xiao En Mo
(74) *Attorney, Agent, or Firm* — MORGAN, LEWIS & BOCKIUS LLP (57) ABSTRACT

A vehicle restart control apparatus includes a processor configured to generate an override torque according to the environment information of the host vehicle when the vehicle is restarted after stopping; and a storage configured to store data and algorithms driven by the processor.

20 Claims, 10 Drawing Sheets

APPARATUS FOR CONTROLLING RESTART A VEHICLE, SYSTEM HAVING THE SAME AND METHOD THEREOF

CROSS-REFERENCE TO RELATED APPLICATION

The present application claims priority to Korean Patent Application No. 10-2021-0127478, filed on Sep. 27, 2021, the entire contents of which is incorporated herein for all purposes by this reference.

BACKGROUND OF THE PRESENT DISCLOSURE

Field of the Present Disclosure

The present disclosure relates to a lane keeping control apparatus, a vehicle system including the same, and a method thereof, and more particularly, to a technique for increasing or decreasing an override torque when a vehicle restarts after stopping.

Description of Related Art

With development of vehicle industry, autonomous driving technology or semi-autonomous driving technology is continuously being developed to provide convenience to drivers. This semi-autonomous driving technology can reduce driver fatigue by driving, braking, and steering a vehicle by a vehicle system instead of a driver.

The semi-autonomous driving system drives at a set speed, maintains a certain inter-vehicle distance with a preceding vehicle, and automatically performs departure control when the vehicle starts after stopping.

In the instant case, in the case where existing required acceleration is applied when the vehicle is stopped and then restarted, departure may be delayed or the vehicle may be pushed, so a technique for preventing this is required.

Figure 1A:
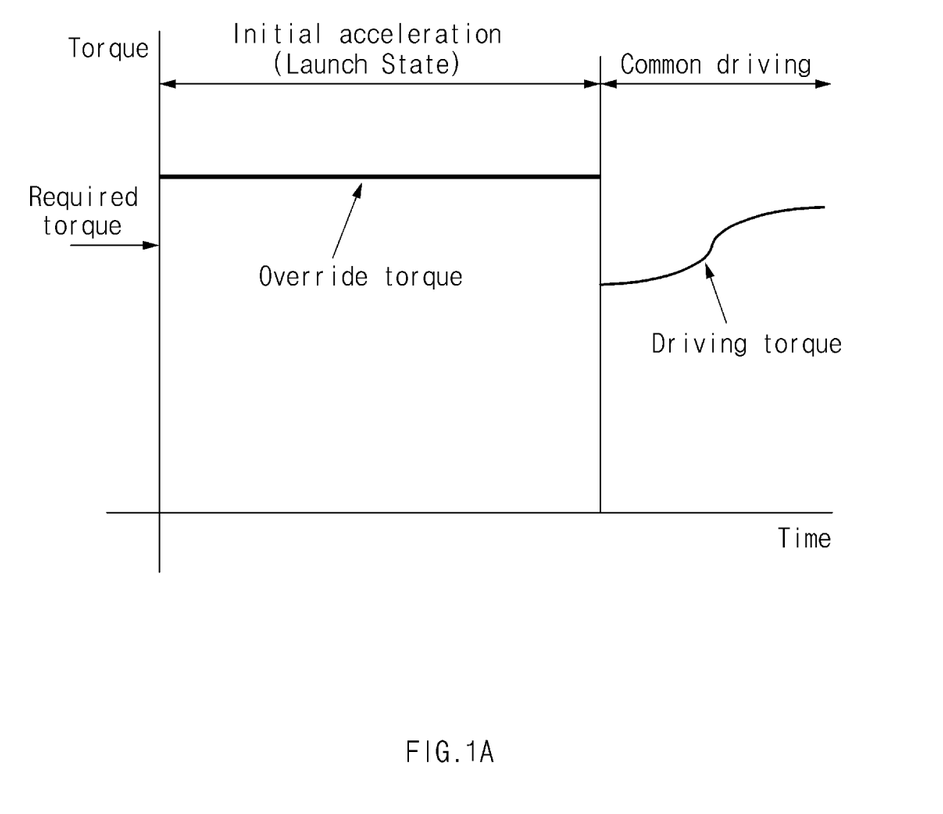
FIG. 1A and FIG. 1B each illustrates an example of torque control upon restart of a conventional vehicle.

FIG. 1A illustrates an example of generating an override torque when starting after stopping the vehicle, securing an initial acceleration force by outputting an initial torque determined depending on a gradient at a time of departure. However, the initial torque is not variable depending on a loading weight of a commercial vehicle, so a different feeling of acceleration may occur depending on the loading weight.

Figure 1B:
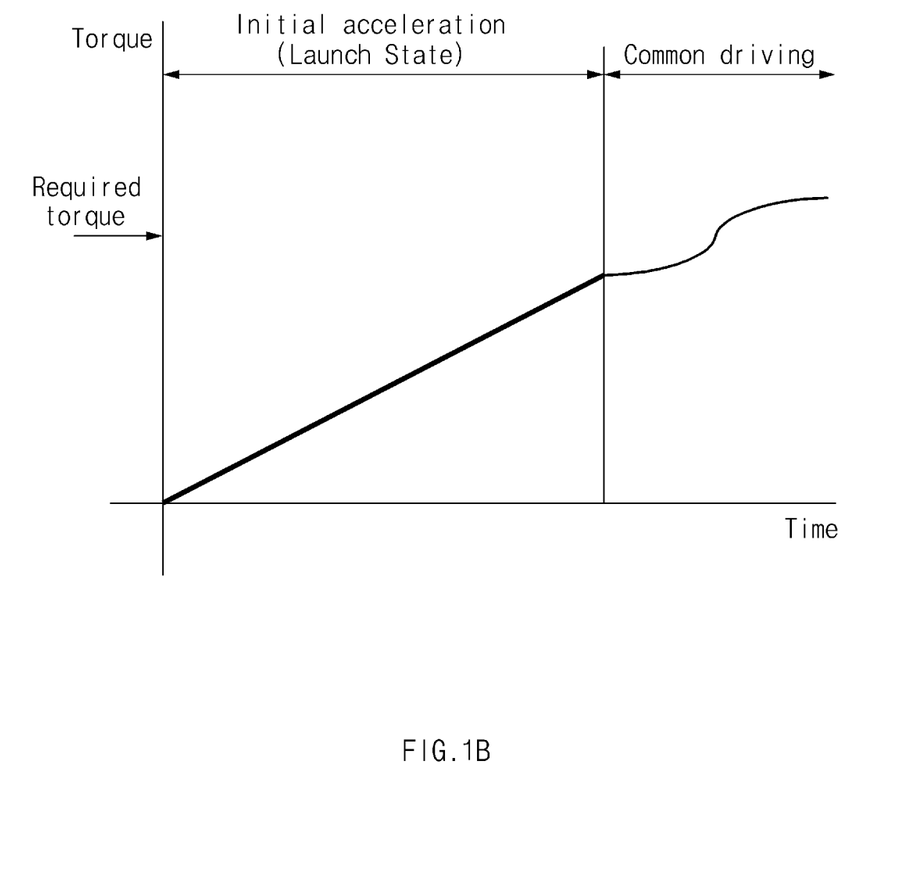

FIG. 1B illustrates an example of securing an initial acceleration force by outputting a torque depending on a predetermined slope when starting the vehicle after stopping it. In the instant case, when a lot of torque is required due to a high slope and a large load, the vehicle is pushed back or it is difficult to restart it at a fast time.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle restart control apparatus, a vehicle system including the same, and a method thereof, configured for allowing for a smooth and fast restart by variably generating an override torque required for acceleration based on a slope, an easy hill start (EHS) signal, a vehicle speed, etc. during initial acceleration for restarting a vehicle after it is stopped.

The technical objects of the present disclosure are not limited to the objects mentioned above, and other technical objects not mentioned may be clearly understood by those skilled in the art from the description of the claims.

Various aspects of the present disclosure are directed to providing a vehicle restart control apparatus including: a processor configured to generate an override torque according to environment information of a host vehicle when the vehicle is restarted after stopping; and a storage configured to store data and algorithms driven by the processor.

In an exemplary embodiment of the present disclosure, the environment information of the host vehicle may include at least one of a slope of a road on which the vehicle is traveling, a weight of the vehicle, front vehicle information, or a signal from a cooperative controller.

In an exemplary embodiment of the present disclosure, the processor, when the road on which the vehicle is traveling is flat or uphill, may determine a first increase rate for increasing the override torque by use of a predetermined basic torque increase rate and a slope to increase the override torque at the first increase rate.

In an exemplary embodiment of the present disclosure, the processor may check whether an easy hill start (EHS) signal is generated and increases the override torque at a second increase rate which is smaller than the first increase rate when the processor concludes that the EHS signal is generated.

In an exemplary embodiment of the present disclosure, the processor may determine whether a speed of the host vehicle exceeds a predetermined first reference value, and when the speed of the host vehicle exceeds the first reference value, may maintain the override torque as a current value.

In an exemplary embodiment of the present disclosure, the processor may reduce the override torque when a predetermined time period elapses while maintaining the override torque as the current value.

In an exemplary embodiment of the present disclosure, the processor may determine a first reduction rate using the predetermined basic torque increase rate, and may reduce the override torque based on the first decrease rate.

In an exemplary embodiment of the present disclosure, the processor may determine whether the speed of the host vehicle exceeds a second reference value which is greater than the first reference value, and may determine a difference value between the override torque and a driving torque when the speed of the host vehicle exceeds the second reference value.

In an exemplary embodiment of the present disclosure, the processor may reduce the override torque according to a second decrease rate which is greater than the first decrease rate when the difference value between the override torque and the driving torque exceeds a predetermined reference value.

In an exemplary embodiment of the present disclosure, the processor may convert the override torque into the driving torque when the difference value between the override torque and the driving torque is smaller than or equal to the predetermined reference value.

In an exemplary embodiment of the present disclosure, the processor, when the road on which the vehicle is traveling is flat or uphill, may output an initial torque depending on a slope.

In an exemplary embodiment of the present disclosure, the processor, may generate the override torque by increasing the initial torque based on a predetermined base torque increase rate.

In an exemplary embodiment of the present disclosure, the processor, may increase the predetermined basic torque increase rate by adding a number of increases to the predetermined basic torque increase rate.

In an exemplary embodiment of the present disclosure, the processor, may determine whether the predetermined basic torque increase rate is increased by use of an easy hill start (EHS) signal or a speed of the host vehicle.

In an exemplary embodiment of the present disclosure, the processor, may adjust a start time of the override torque and an increase rate of the override torque according to at least one of motion information of a front vehicle, a speed of the front vehicle, or an inter-vehicle distance to the front vehicle.

Various aspects of the present disclosure are directed to providing a vehicle system including: a sensing device configured to detect environment information of a host vehicle; a processor configured to generate an override torque according to the environment information of the host vehicle when the vehicle is restarted after stopping; and a vehicle driving device configured to drive the host vehicle based on the override torque.

In an exemplary embodiment of the present disclosure, the environment information of the host vehicle may include at least one of a slope of a road on which the vehicle is traveling, a weight of the vehicle, front vehicle information, or a signal from a cooperative controller.

Various aspects of the present disclosure are directed to providing a vehicle restart control method including: obtaining environment information of a host vehicle upon restarting the host vehicle after the host vehicle is stopped; generating an override torque according to the environment information of the host vehicle; and driving the host vehicle according to the override torque.

In an exemplary embodiment of the present disclosure, the generating of the override torque may include: when the road on which the vehicle is traveling is flat or uphill, determining a first increase rate for increasing the override torque by use of a predetermined basic torque increase rate and a slope to increase the override torque at the first increase rate; checking whether an easy hill start (EHS) signal is generated and increasing the override torque at a second increase rate which is smaller than the first increase rate when the EHS signal is generated; and reducing the override torque depending on a vehicle speed of the vehicle.

In an exemplary embodiment of the present disclosure, the generating of the override torque may include: when the road on which the vehicle is traveling is flat or uphill, outputting an initial torque depending on a slope; generating the override torque by increasing the initial torque based on a predetermined base torque increase rate; increasing the override torque at an increase rate that is lower than the predetermined basic torque increase rate when the EHS signal is generated; and reducing the override torque depending on a vehicle speed of the vehicle.

According to the present technique, it is possible to allow for a smooth and fast restart by variably generating an override torque required for acceleration based on a slope, an easy hill start (EHS) signal, a vehicle speed, etc. during initial acceleration for restarting a vehicle after it is stopped.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 2 to FIG. 9.

Figure 2:
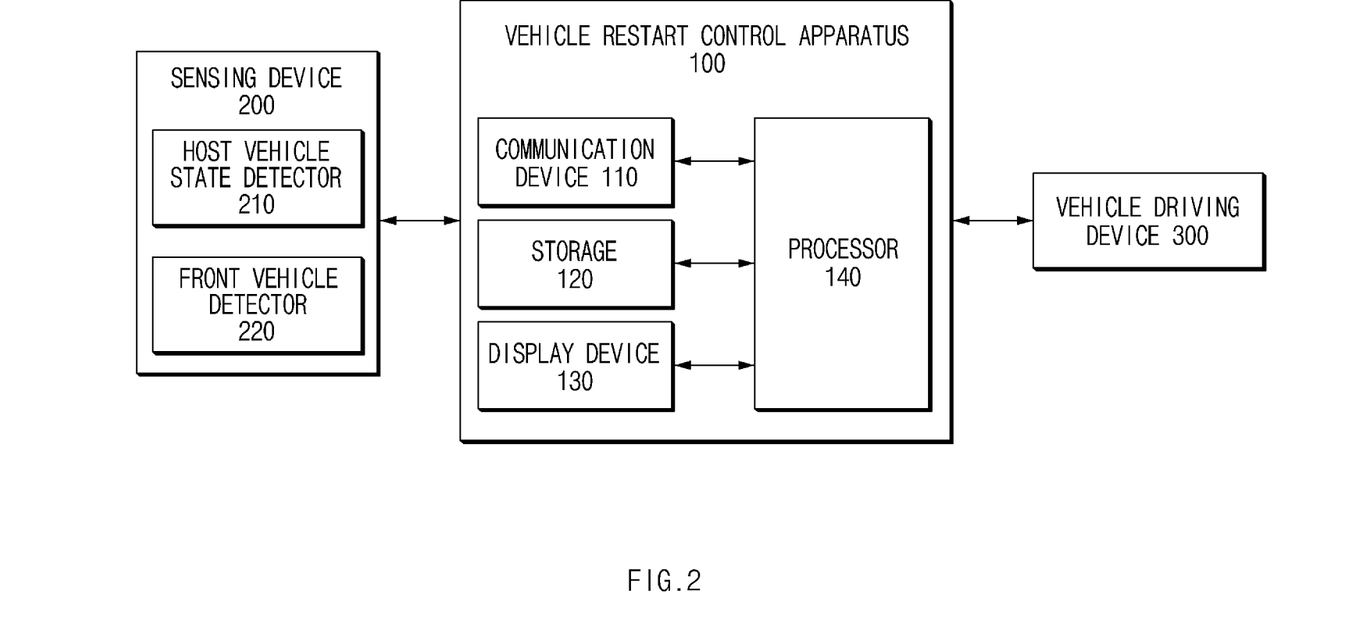
FIG. 2 illustrates a block diagram showing a configuration of a vehicle system including a vehicle restart control apparatus according to various exemplary embodiments of the present disclosure.
Figure 3:
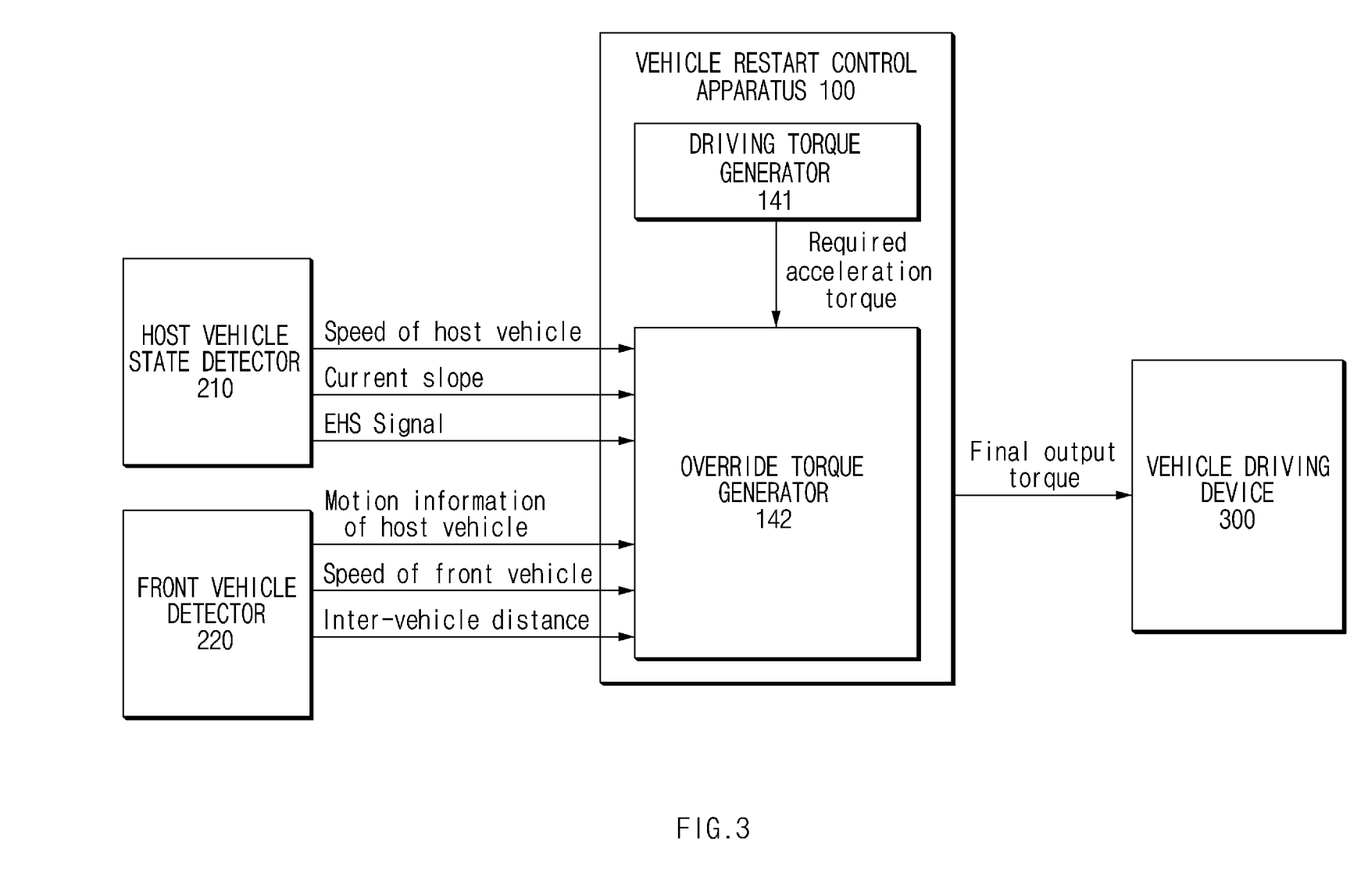
FIG. 3 illustrates a view for describing a signal flow of the vehicle restart control apparatus of FIG. 2.

FIG. 2 illustrates a block diagram showing a configuration of a vehicle system including a vehicle restart control apparatus according to various exemplary embodiments of the present disclosure, and FIG. 3 illustrates a view for describing a signal flow of the vehicle restart control device of FIG. 2.

Referring to FIG. 2, the vehicle system according to the exemplary embodiment of the present disclosure may include a vehicle restart control apparatus 100, a sensing device 200, and a vehicle driving device 300.

The vehicle restart control apparatus 100 according to the exemplary embodiment of the present disclosure may be implemented inside the vehicle. In the instant case, the vehicle restart control apparatus 100 may be integrally formed with internal control units of the vehicle, or may be implemented as a separate device to be connected to control units of the vehicle by a separate connection means.

The vehicle restart control apparatus 100 may be applied to a highway driving assist (HDA), a lane following assist (LFA), a smart cruise control (SCC), an advanced smart cruise control (ASCC) system, an advanced driver assistance system (ADAS), a remote smart parking assist (RSPS), a lane departure warning system (LDWS), a lane keeping assist system (LKAS), a blind spot detection (BSD) system, a forward collision warning system (FCWS), a driver drowsiness detection system, a pedestrian detection (PD) system, a traffic sign recognition (TSR) system, a blind-spot view monitoring (BVM) system, a traffic jam Assist (TJA) system, and the like.

When a vehicle needs to be driven again after a complete stop during autonomous or semi-autonomous driving, the vehicle may be delayed or the vehicle may be pushed with a torque of required acceleration generated by a driving controller, and thus the vehicle may be driven by generating a predetermined override torque. In the instant case, it may be necessary to adjust the override torque depending on a slope of a road, a weight of the vehicle, front vehicle information, and the like.

The vehicle restart control apparatus 100 may generate an override torque according to environment information of a host vehicle when the vehicle is stopped and then restarted. In the instant case, the environment information of the host vehicle may include at least one of a gradient of a road on which the vehicle is traveling, a weight of the vehicle, front vehicle information, or a signal of a cooperative controller. Herein, the front vehicle information may include motion information of the front vehicle, a speed of the front vehicle, an inter-vehicle distance with the front vehicle, and the like. The signal of the cooperative controller may include an easy hill start (EHS) signal. That is, an EHS device is a device that maintains a braking force for a certain time period to facilitate starting the vehicle by preventing the vehicle from being pushed back when starting on a hill, the EHS signal is a signal indicating that a time has come when a torque has been sufficiently increased to enable a brake to be released, and the vehicle restart control apparatus 100 may receive the EHS signal from the EHS device. In the instant case, the override torque indicates a torque required for acceleration when starting the vehicle after stopping independently of the driving torque.

Referring to FIG. 2, the vehicle restart control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, Local Interconnect Network (LIN) communication, flex-ray communication, Ethernet communication, and the like. As an exemplary embodiment of the present disclosure, the communication device 110 may receive a sensing result from the sensing device 200, and may transmit a final torque to the vehicle driving device 300.

Furthermore, the communication device 110 may perform communication by use of a server, infrastructure, or third vehicles (e.g., a front vehicle) outside the vehicle, and the like through a wireless Internet technique or short range communication technique. For example, the communication device 110 may receive front vehicle information from the front vehicle. Herein, the wireless Internet technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

The storage 120 may store sensing results of the sensing device 200 and data and/or algorithms required for the processor 140 to operate, and the like.

As an exemplary embodiment of the present disclosure, the storage 120 may pre-store a basic torque increase rate set by an experimental value for an override increase, values for adjusting the basic torque increase rate, a reference value for determining a difference between the driving torque and the override torque, a reference value for determining a degree of elapsed time after maintaining the override torque, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may further include a mouse, a joystick, a jog shuttle, a stylus pen, and the like. Furthermore, the input means may further include a soft key implemented on the display.

The interface device 130 may be implemented as a head-up display (HUD), a cluster, an audio video navigation (AVN), a human machine interface (HM), a user setting menu (USM), or the like.

The output means may include a display, and may further include a voice output means such as a speaker. In the instant case, when a touch detector formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display. For example, the interface device 130 may output a control state of the vehicle restart control apparatus 100 so that a user recognizes it.

The processor 140 may be electrically connected to the communication device 110, the storage 120, the interface device 130, and the like, may electrically control each component, and may be an electrical circuit that executes software commands, performing various data processing and calculations described below.

The processor 140 may process a signal transferred between components of the vehicle restart control apparatus 100, and may perform overall control so that each of the components can perform its function normally.

The processor 140 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

As illustrated in FIG. 3, the processor 140 of the vehicle restart control apparatus 100 may include a driving torque generator 141 and an override torque generator 142.

The driving torque generator 141 transmits the requested acceleration torque to the override torque generator 142, and the override torque generator 142 increases or decreases the override torque by use of information outputted from a host vehicle state detector 210 and a front vehicle detector 220, to output the final torque.

The processor 140 may generate the override torque based on the environment information (slope, EHS signal, vehicle speed, etc.) of the host vehicle when starting again after stopping the vehicle.

When the road on which the vehicle is traveling is flat or uphill, the processor 140 may determine a first increase rate for increasing the override torque by use of a predetermined basic torque increase rate and slope to increase the override torque at the first increase rate.

The processor 140 may check whether the easy hill start (EHS) signal is generated, and may increase the override torque at a second increase rate which is smaller than the first increase rate when the processor concludes that the EHS signal is generated.

The processor 140 may determine whether the speed of the host vehicle exceeds a predetermined first reference value, and when the speed of the host vehicle exceeds the first reference value, may maintain the override torque as a current value.

The processor 140 may decrease the override torque when a predetermined time period elapses while maintaining the override torque to the current value.

The processor 140 may determine a first decrease rate by use of the basic torque increase rate, and may reduce the override torque based on the first decrease rate.

The processor 140 may determine whether the speed of the host vehicle exceeds a second reference value which is greater than the first reference value, and when the speed of the host vehicle exceeds the second reference value, may determine a difference value between the override torque and the driving torque.

When the difference value between the override torque and the driving torque exceeds a predetermined reference value, the processor 140 may reduce the override torque according to a second decrease rate which is greater than the first decrease rate.

The processor 140 may convert the override torque into the driving torque when the difference value between the override torque and the driving torque is smaller than or equal to the predetermined reference value.

When the road on which the vehicle is traveling is flat or uphill, the processor 140 may output the initial torque depending on the slope.

The processor 140 may generate the override torque by increasing the initial torque based on the predetermined basic torque increase rate, when the easy hill start (EHS) signal is generated, may increase the override torque at an increase rate which is lower than the basic torque increase rate, and may reduce the override torque depending on the vehicle speed of the vehicle.

Thereafter, the processor 140 may reduce the override torque when the override torque is greater than the driving torque by a predetermined level or more, and may convert the override torque into the driving torque when the difference value between the override torque and the driving torque is within a predetermined value.

The processor 140 may increase the basic torque increase rate by adding a number of increases to the predetermined basic torque increase rate, and may determine whether the basic torque increase rate is increased by use of the easy hill start (EHS) signal or the speed of the host vehicle.

The processor 140 may adjust a start time of the override torque and an increase rate of the override torque based on at least one of motion information of a front vehicle, a speed of the front vehicle, or an inter-vehicle distance to the front vehicle. For example, when a speed of the vehicle is slower than the speed of the host vehicle, the start time of the override torque may be delayed or an increase rate of the override torque may be reduced.

The sensing device 200 may detect a state of the host vehicle, and may detect a front vehicle.

To the present end, the sensing device 200 may include the host vehicle state detector 210 and the front vehicle detector 220.

The host vehicle state detector 210 may detect a speed of the host vehicle, a slope of a currently driving road, an input of the EHS signal, a weight of the host vehicle, and the like to provide it to the vehicle restart control apparatus 100.

The front vehicle detector 220 may detect motion information of the front vehicle, a speed of the front vehicle, an inter-vehicle distance with the front vehicle, and the like to provide it to the vehicle restart control apparatus 100. In the instant case, information of the front vehicle may be obtained through communication with the front vehicle instead of the front vehicle detector 220.

For example, the sensing device 200 may include at least one camera, an ultrasonic detector, a Light Detection and Ranging (LiDAR), a steering angle detector, and the like.

The vehicle driving device 300 may drive the vehicle based on the final output torque which is outputted from the vehicle restart control apparatus 100.

Accordingly, according to an exemplary embodiment of the present disclosure, it is possible to control restart to proceed rapidly while minimizing a sense of heterogeneity by smoothly increasing the increase rate of the override torque based on the slope of the road on which the vehicle is traveling, the EHS signal, the vehicle weight, the front vehicle information, etc. when the vehicle restarts after stopping.

Figure 4:
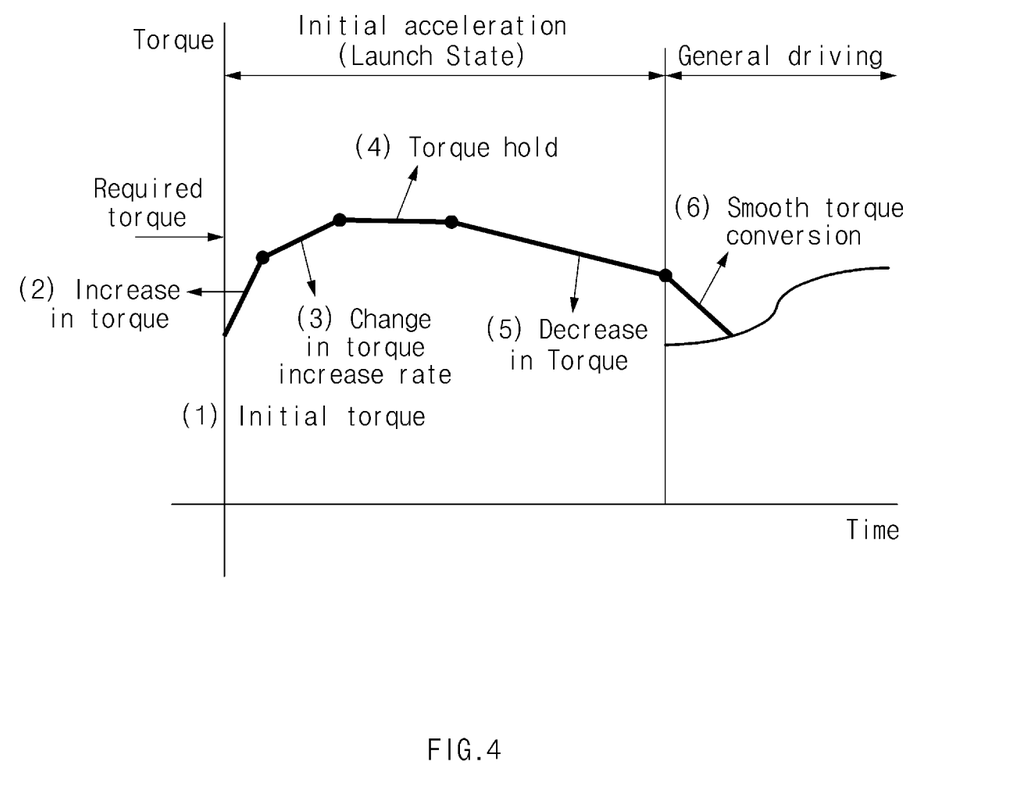
FIG. 4 illustrates a view for describing an example of vehicle restart control according to various exemplary embodiments of the present disclosure.
Figure 6:
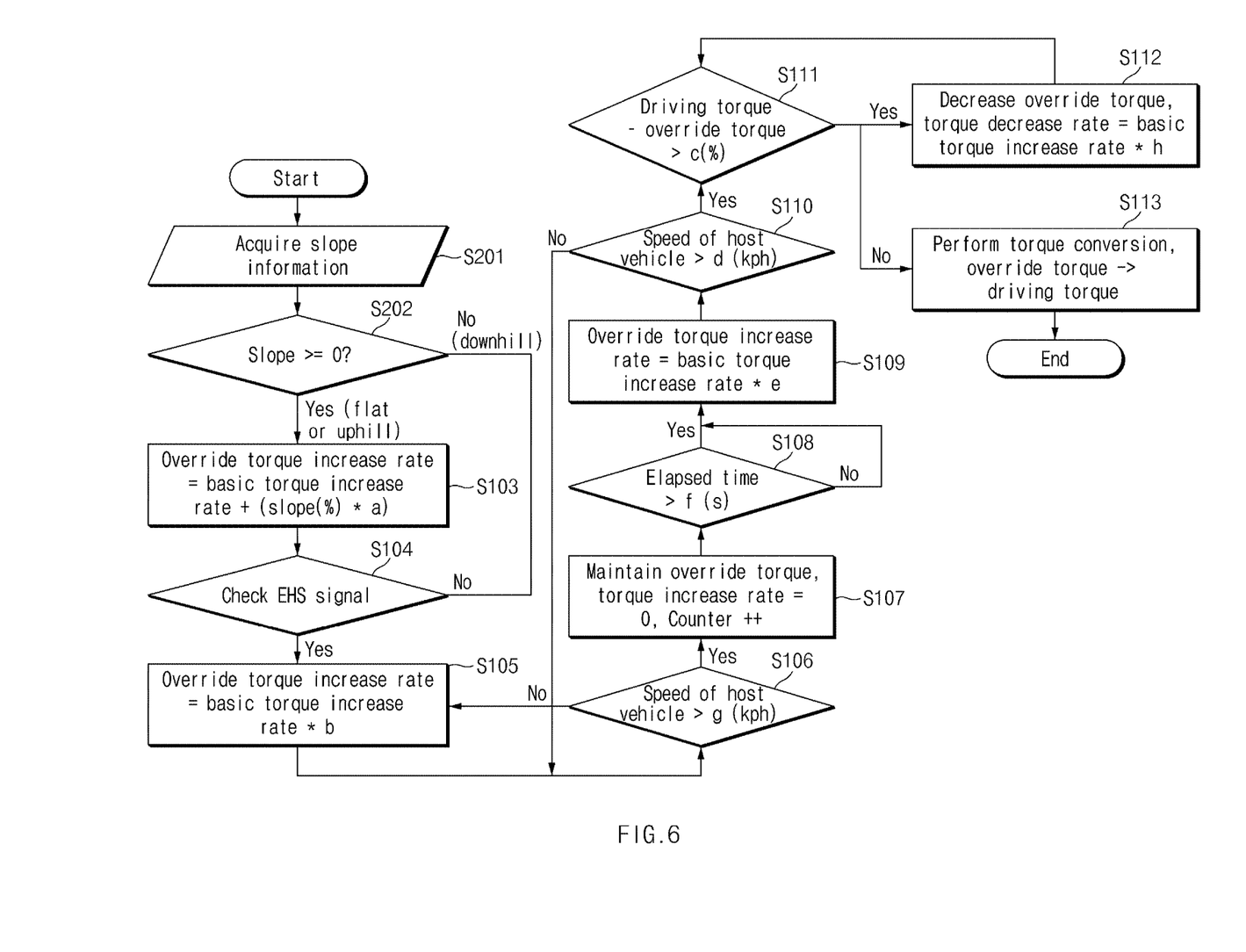
FIG. 6 illustrates a flowchart showing a vehicle restart control method according to various exemplary embodiments of the present disclosure.

Hereinafter, a vehicle restart control method for a vehicle according to various exemplary embodiments of the present disclosure will be described in detail with reference to FIG. 4 and FIG. 6. FIG. 4 illustrates a view for describing an example of vehicle restart control according to various exemplary embodiments of the present disclosure, and FIG. 6 illustrates a flowchart showing a vehicle restart control method according to various exemplary embodiments of the present disclosure. FIG. 6 illustrates an example of override torque control when an initial torque does not exist.

Hereinafter, it is assumed that the vehicle restart control apparatus 100 of the of FIG. 2 performs processes of FIG. 6. Furthermore, in the description of FIG. 6, operations referred to as being performed by a device may be understood as being controlled by the processor 140 of the vehicle restart control apparatus 100.

Referring to FIG. 6, the vehicle restart control apparatus 100 obtains slope information of a currently driving road (S101).

The vehicle restart control apparatus 100 may determine whether a slope is equal to or greater than 0 (S102), and when it is equal to or greater than 0, may determine that the current road is flat or uphill.

When the current road is flat or uphill, the vehicle restart control apparatus 100 increases an override torque (S103). Meanwhile, when the slope is less than 0, the vehicle restart control apparatus 100 may determine that the slope is downhill, and may reduce an increase rate of the override torque (S105). That is, the vehicle restart control apparatus 100 may increase the override torque on the uphill in consideration of the slope. In the instant case, the vehicle restart control apparatus 100 may calculate a torque increase rate for increasing the override torque by adding a value obtained by multiplying a slope value and a predetermined constant "a" to a basic torque increase rate. Herein, the basic torque increase rate and the constant a may be predetermined by an experimental value to increase the override torque when the vehicle restarts. As shown in section (2) of FIG. 4, the override torque is increased at the basic torque increase rate which is basically determined up to a torque value suitable for starting.

The vehicle restart control apparatus 100 checks whether an EHS signal is generated (S104). That is, an EHS device is a device that maintains a braking force for a predetermined time period to facilitate starting the vehicle by preventing the vehicle from being pushed back when starting on a hill, and the EHS signal is a signal indicating that a time has come when a torque has been sufficiently increased to enable a brake to be released.

When the EHS signal is not generated, the increase rate is recalculated to increase the override torque, and when the EHS signal is generated, the vehicle restart control apparatus 100 reduces the basic torque increase rate by a predetermined ratio "b" to reduce the increase rate of the override torque (S105). That is, the torque is increased when the vehicle is restarted, but when the override torque is increased to prevent the vehicle from being pushed back, the torque increase rate is slightly decreased to reduce the sense of heterogeneity. As shown in (3) of FIG. 4, the torque increase rate is decreased to increase the override torque. For example, when the basic torque increase rate is 1% and a slope increase rate is 1%, the override torque in step S103 increases by 2% per second. Thereafter, the EHS signal is generated to reduce the basic torque increase rate by 0.5, and in step S105, the override torque is increased by 0.5% per second. That is, the vehicle restart control apparatus 100 performs appropriate torque control in more detail by slightly lowering the torque increase rate from a time when the EHS signal is received during uphill slope.

The vehicle restart control apparatus 100 determines whether a speed of the host vehicle is greater than a predetermined speed "g" after the override torque is reduced (S106).

When the speed of the host vehicle is greater than the predetermined speed g, the vehicle restart control apparatus 100 sets the torque increase rate to 0 to maintain a current value without decreasing or increasing the override torque (S107). That is, when the host vehicle actually starts to move, the vehicle restart control apparatus 100 holds the override torque without increasing it. As shown in (4) of FIG. 4, the override torque is held. That is, the vehicle restart control apparatus 100 holds the override torque without further increasing it when the vehicle actually starts moving.

Thereafter, the vehicle restart control apparatus 100 checks whether a predetermined time period has elapsed (S108). That is, the vehicle restart control apparatus 100 checks whether the elapsed time after torque decrease rate exceeds a predetermined time period "f".

When the elapsed time after the torque reduction exceeds the predetermined time period f, the vehicle restart control apparatus 100 reduces the override torque (S109). In the instant case, the vehicle restart control apparatus 100 may determine a torque decrease rate by multiplying the basic torque increase rate by a predetermined ratio "e". That is, the vehicle restart control apparatus 100 decreases the override torque per second by a torque decrease rate which is reduced from a current override torque. For example, when the torque decrease rate is 0.5%, the override torque will decrease by 0.5% per second from a current value. That is, the vehicle restart control apparatus 100 reduces the override torque based on a predetermined decrease rate when a predetermined time period has elapsed since the vehicle actually started to move. As shown in (5) of FIG. 4, when the predetermined time period elapses after the vehicle actually starts to move, the override torque is reduced depending on the predetermined decrease rate.

Thereafter, the vehicle restart control apparatus 100 checks whether the speed of the host vehicle exceeds a predetermined reference speed "d" (S110), and when the speed of the host vehicle speed exceeds the predetermined reference value d, checks whether a difference value between the driving torque and the override torque is greater than a predetermined value "c". In the instant case, the predetermined reference value d may be set to be greater than the predetermined reference value g in step S106.

When the difference value between the driving torque and the override torque is greater than the predetermined value c, the vehicle restart control apparatus 100 reduces the override torque (S112). In the instant case, a decrease rate of the override torque is obtained by multiplying the basic torque increase rate by a predetermined ratio "h", and h may be set to a value which is greater than e.

Meanwhile, when the difference value between the driving torque and the override torque is equal to or smaller than the predetermined value c, the vehicle restart control apparatus 100 converts the override torque into the driving torque (S113).

That is, when the difference value between the override torque and the driving torque is large, the vehicle restart control apparatus 100 increases the decrease rate of the override torque to decrease the override torque. When the torque decrease rate in step S109 is 0.5%, the torque decrease rate in step S112 is increased to 0.8%, and in step S112, the override torque is reduced by 0.8% per second.

In the instant case, when the override torque is reduced in step S112, the vehicle restart control apparatus 100 returns to the previous step S111 and continues to check the difference value between the driving torque and the override torque, and when the difference value between the driving torque and the override torque is smaller than or equal to a predetermined value, may minimize a sense of heterogeneity by performing torque conversion. That is, the vehicle restart control apparatus 100 reduces the override torque until it approaches the driving torque to converter the override torque into the driving torque. As shown in (6) of FIG. 4, when the speed of the vehicle increases to a certain extent, the torque value is converted from the override torque to the driving torque, and in the instant case, the difference value between the two torques is controlled to have not too much difference, smoothly performing the torque conversion without the sense of heterogeneity. For example, when the override torque is 5 and the driving torque is 4, the driving torque is changed to 5.

Figure 7:
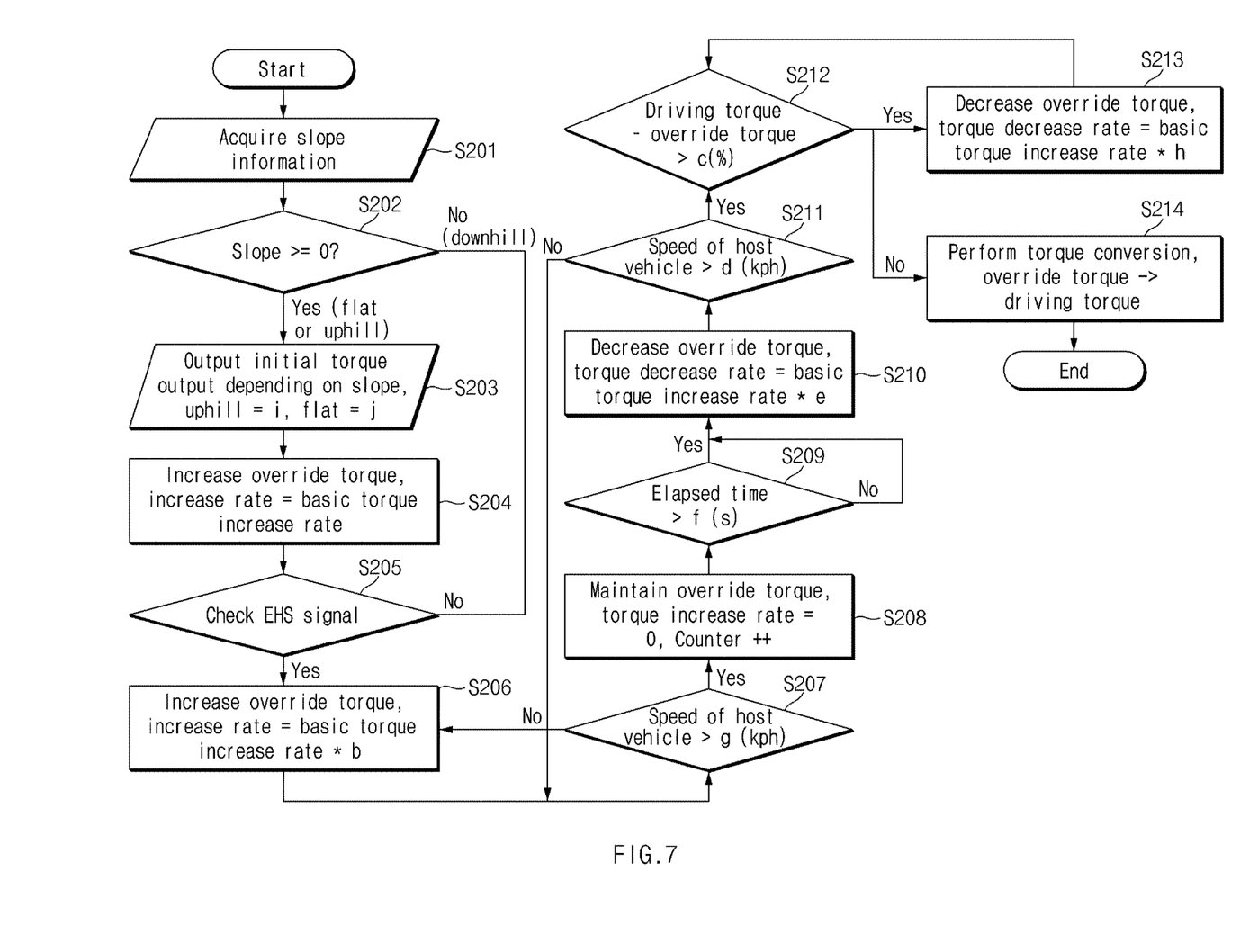
FIG. 7 illustrates a flowchart showing a vehicle restart control method according to various exemplary embodiments of the present disclosure.

Hereinafter, an integrated control method for a vehicle according to various exemplary embodiments of the present disclosure will be described in detail with reference to FIG. 4 and FIG. 7. FIG. 7 illustrates a flowchart showing a vehicle restart control method according to various exemplary embodiments of the present disclosure. FIG. 7 illustrates an example of override torque control when an initial torque exists.

Hereinafter, it is assumed that the vehicle restart control apparatus 100 of the of FIG. 2 performs processes of FIG. 7. Furthermore, in the description of FIG. 7, operations referred to as being performed by a device may be understood as being controlled by the processor 140 of the vehicle restart control apparatus 100.

Referring to FIG. 7, the vehicle restart control apparatus 100 obtains slope information of a currently driving road (S201).

The vehicle restart control apparatus 100 may determine whether a slope is equal to or greater than 0 (S202), and when it is equal to or greater than 0, may determine that the current driving road is flat or uphill.

When the slope is less than 0, the vehicle restart control apparatus 100 may determine that the slope is downhill, and may reduce an increase rate of the override torque (S206).

Meanwhile, when the current road is flat or uphill, the vehicle restart control apparatus 100 outputs an initial torque depending on a slope (S203). In the instant case, the vehicle restart control apparatus 100 may output the initial torque as if in the case of an uphill slope, and may output the initial torque as j in the case of a flat road. In the instant case, the initial torque depending on the slope may be predetermined as an experimental value. As shown in (1) of FIG. 4, it is possible to save a torque securing time by outputting a predetermined initial torque depending on the slope.

Thereafter, the vehicle restart control apparatus 100 may increase an override torque by adding a basic torque increase rate to the initial torque (S204).

Thereafter, because steps S205 to S214 are the same as steps S104 to S113 of FIG. 6, a detailed description thereof will be omitted.

Figure 5:
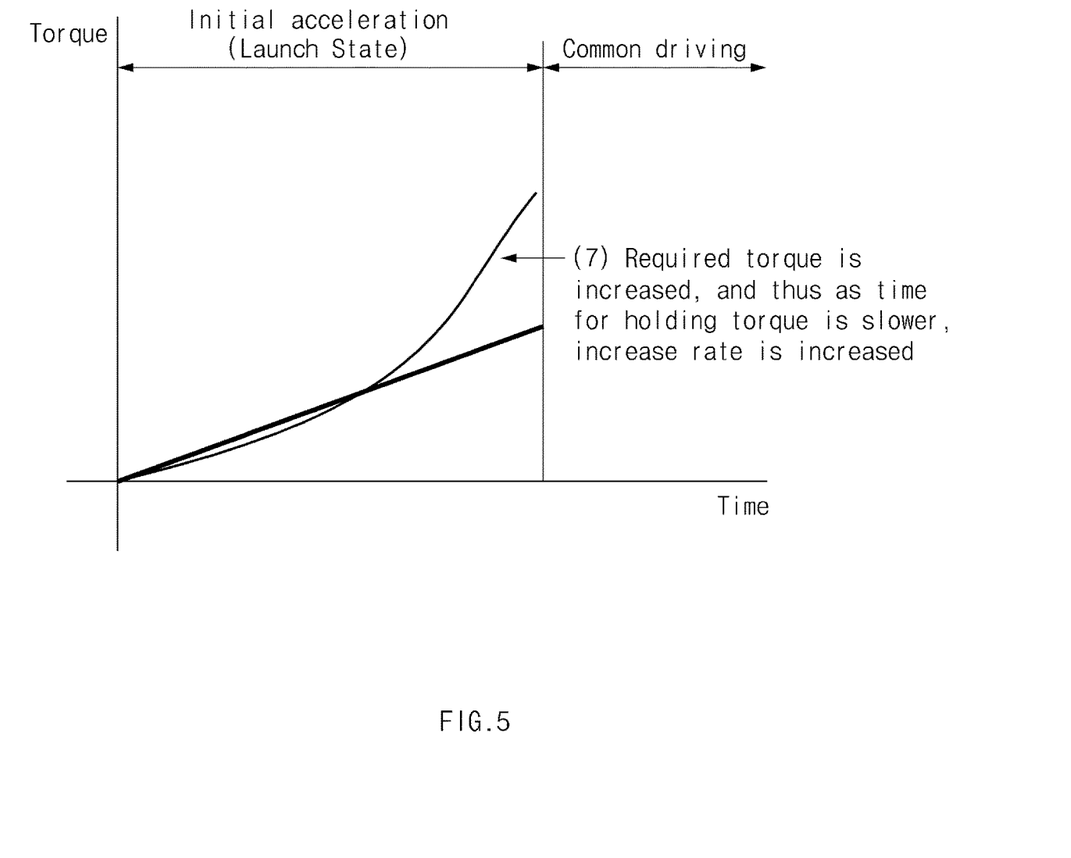
FIG. 5 illustrates a view for describing an example of controlling an increase rate of an override torque according to various exemplary embodiments of the present disclosure.
Figure 8:
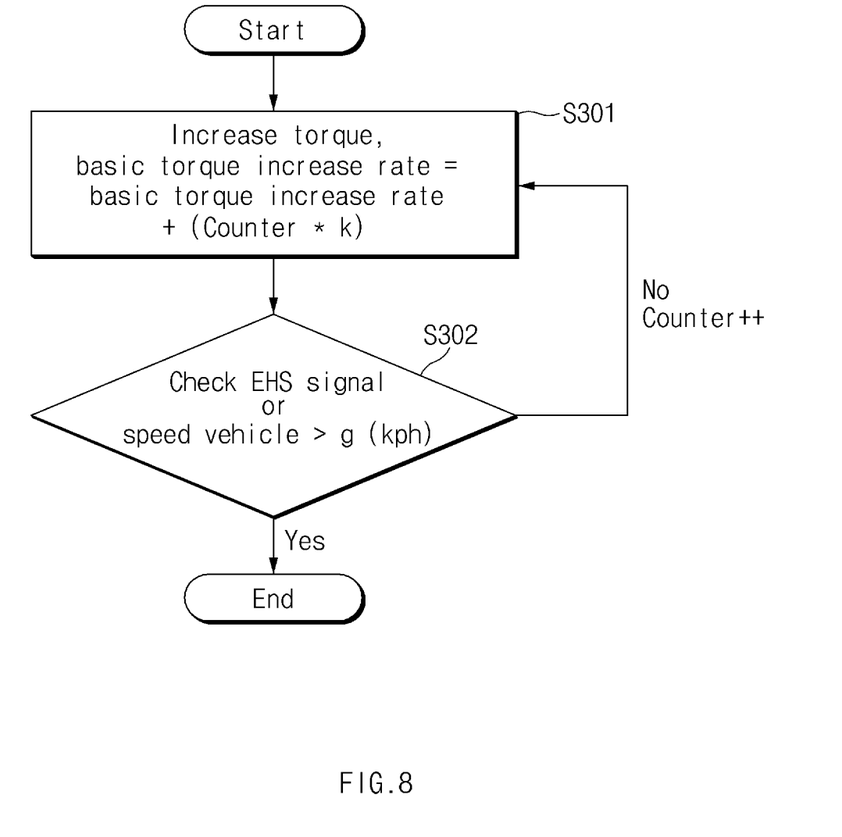
FIG. 8 illustrates a flowchart showing a process of determining an override torque increase rate according to various exemplary embodiments of the present disclosure.

Hereinafter, a process of determining an override torque increase rate according to various exemplary embodiments of the present disclosure will be described in detail with reference to FIG. 8 and FIG. 5. FIG. 8 illustrates a flowchart showing a process of determining an override torque increase rate according to various exemplary embodiments of the present disclosure.

Hereinafter, it is assumed that the vehicle restart control apparatus 100 of the of FIG. 2 performs processes of FIG. 8. Furthermore, in the description of FIG. 8, operations referred to as being performed by a device may be understood as being controlled by the processor 140 of the vehicle restart control apparatus 100.

First, the vehicle restart control apparatus 100 increases a basic torque increase rate by adding a value obtained by multiplying a counter which is a number of increases and a predetermined constant k to the basic torque increase rate.

Thereafter, the vehicle restart control apparatus 100 checks whether a EHS signal exists or whether a speed of a host vehicle exceeds the predetermined reference value g (S302), and stops increasing the torque when the EHS signal exists or the speed of the host vehicle exceeds the predetermined reference value g.

On the other hand, when the EHS signal does not exist or the speed of the host vehicle is smaller than a predetermined reference value g, the vehicle restart control apparatus 100 increments a counter by 1 and repeats step S301.

FIG. 8 illustrates a process for determining the torque increase rate of FIG. 6 and FIG. 7, which may be performed in parallel with FIG. 6 and FIG. 7. That is, the process of FIG. 8 is an internal flow for increasing the override torque of steps S103 and S204 of FIG. 6 and FIG. 7.

Accordingly, according to an exemplary embodiment of the present disclosure, when a commercial vehicle is initially accelerated, it is possible to variably generate the override torque required for acceleration using the slope and a vehicle brake signal (EHS signal) to enable a smooth and fast restart.

Furthermore, although an example of increasing the override torque using the slope of the road and the EHS signal is described in FIG. 6, FIG. 7, and FIG. 8, a start time of the override torque may be changed or the increase rate of the override torque may be adjusted in further consideration of front vehicle information and a weight of the vehicle. As shown in (7) of FIG. 5, when an actual EHS signal is not generated or an override torque increase duration becomes longer, such as when the vehicle is not moving, the vehicle restart control apparatus 100 may increase the override torque increase rate depending on such duration.

Figure 9:
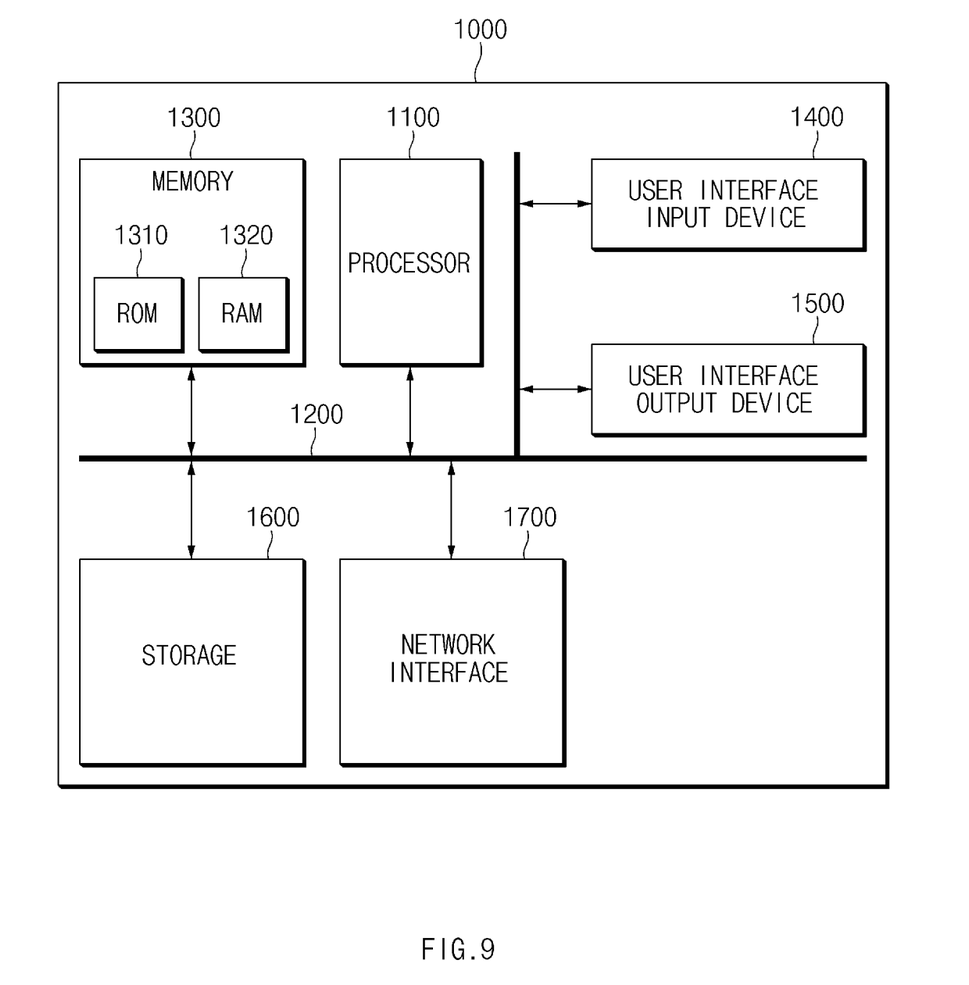
FIG. 9 illustrates a computing system according to various exemplary embodiments of the present disclosure.

FIG. 9 illustrates a computing system according to various exemplary embodiments of the present disclosure.

Referring to FIG. 9, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which an exemplary embodiment of the present disclosure pertains may make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle restart control apparatus comprising:
a processor configured to generate an override torque according to environment information of a host vehicle when the host vehicle is restarted after stopping; and
a storage configured to store data and algorithms driven by the processor.

2. The vehicle restart control apparatus of claim 1, wherein the environment information of the host vehicle includes at least one of a slope of a road on which the host vehicle is traveling, a weight of the host vehicle, front vehicle information, or a signal from a cooperative controller.

3. The vehicle restart control apparatus of claim 1, wherein when the road on which the host vehicle is traveling is flat or uphill, the processor is configured to determine a first increase rate for increasing the override torque by use of a predetermined basic torque increase rate and a slope to increase the override torque at the first increase rate.

4. The vehicle restart control apparatus of claim 3, wherein the processor is configured to check whether an easy hill start (EHS) signal is generated and configured to increase the override torque at a second increase rate which is smaller than the first increase rate when the processor concludes that the EHS signal is generated.

5. The vehicle restart control apparatus of claim 4, wherein the processor is configured to determine whether a speed of the host vehicle exceeds a predetermined first reference value, and when the processor concludes that the speed of the host vehicle exceeds the first reference value, configured to maintain the override torque as a current value.

6. The vehicle restart control apparatus of claim 5, wherein the processor is configured to reduce the override torque when a predetermined time elapses while maintaining the override torque as the current value.

7. The vehicle restart control apparatus of claim 6, wherein the processor is configured to determine a first decrease rate by use of the predetermined basic torque increase rate, and configured to reduce the override torque based on the first decrease rate.

8. The vehicle restart control apparatus of claim 7, wherein the processor is configured to determine whether the speed of the host vehicle exceeds a second reference value which is greater than the first reference value, and configured to determine a difference value between the override torque and a driving torque when the speed of the host vehicle exceeds the second reference value.

9. The vehicle restart control apparatus of claim 8, wherein the processor is configured to reduce the override torque according to a second decrease rate which is greater than the first decrease rate when the difference value between the override torque and the driving torque exceeds a predetermined reference value.

10. The vehicle restart control apparatus of claim 8, wherein the processor is configured to convert the override torque into the driving torque when the difference value between the override torque and the driving torque is smaller than or equal to the predetermined reference value.

11. The vehicle restart control apparatus of claim 1, wherein when the road on which the host vehicle is traveling is flat or uphill, the processor is configured to output an initial torque depending on a slope.

12. The vehicle restart control apparatus of claim 11, wherein the processor is configured to generate the override torque by increasing the initial torque based on a predetermined basic torque increase rate.

13. The vehicle restart control apparatus of claim 1, wherein the processor is configured to increase a predetermined basic torque increase rate by adding a number of increases to the predetermined basic torque increase rate.

14. The vehicle restart control apparatus of claim 13, wherein the processor is configured to determine whether the predetermined basic torque increase rate is increased by use of an easy hill start (EHS) signal or a speed of the host vehicle.

15. The vehicle restart control apparatus of claim 1, wherein the processor is configured to adjust a start time of the override torque and an increase rate of the override torque according to at least one of motion information of a front vehicle, a speed of the front vehicle, or an inter-vehicle distance to the front vehicle.

16. A vehicle system comprising:
a sensing device configured to detect environment information of a host vehicle;
a processor configured to generate an override torque according to the environment information of the host vehicle when the host vehicle is restarted after stopping; and
a vehicle driving device configured to drive the host vehicle based on the override torque.

17. The vehicle system of claim 16, wherein the environment information of the host vehicle includes at least one of a slope of a road on which the host vehicle is traveling, a weight of the host vehicle, front vehicle information, or a signal from a cooperative controller.

18. A vehicle restart control method comprising:
obtaining, by a processor, environment information of a host vehicle upon restarting the host vehicle after the host vehicle is stopped;
generating, by the processor, an override torque according to the environment information of the host vehicle; and
driving, by the processor, the host vehicle according to the override torque.

19. The vehicle restart method of controlling claim 18, wherein the generating of the override torque includes:
when a road on which the host vehicle is traveling is flat or uphill,
determining a first increase rate for increasing the override torque by use of a predetermined basic torque increase rate and a slope to increase the override torque at the first increase rate;
checking whether an easy hill start (EHS) signal is generated and increasing the override torque at a second increase rate which is smaller than the first increase rate when the processor concludes that the EHS signal is generated; and
reducing the override torque depending on a vehicle speed of the host vehicle.

20. The vehicle restart method of controlling claim 18, wherein the generating of the override torque includes:
when a road on which the host vehicle is traveling is flat or uphill,
outputting an initial torque depending on a slope;
generating the override torque by increasing the initial torque according to a predetermined basic torque increase rate;
increasing the override torque at an increase rate which is lower than the predetermined basic torque increase rate when the EHS signal is generated; and
reducing the override torque depending on a vehicle speed of the host vehicle.

\* \* \* \* \*